United States Patent [19]

Terhune

[11] Patent Number: 5,045,192
[45] Date of Patent: Sep. 3, 1991

[54] FILTER ASSEMBLY WITH LOCKABLE LUG MEANS

[75] Inventor: Ralph D. Terhune, Broken Arrow, Okla.

[73] Assignee: Facet Enterprises, Inc., Tulsa, Okla.

[21] Appl. No.: 404,865

[22] Filed: Sep. 8, 1989

Related U.S. Application Data

[63] Continuation-in-part of Ser. No. 870,237, Jun. 3, 1986, Pat. No. 4,871,455

[51] Int. Cl.$^5$ .............................................. B01D 27/08
[52] U.S. Cl. .................................. 210/232; 210/493.2; 210/DIG. 17
[58] Field of Search ...................... 210/282, 238, 416.4, 210/DIG. 5, DIG. 17, 493.2; 55/506, 507

[56] References Cited

U.S. PATENT DOCUMENTS

| | | | |
|---|---|---|---|
| 3,085,689 | 4/1963 | Hering et al. | 210/232 |
| 3,160,000 | 12/1964 | Mosher | 73/61 |
| 3,272,340 | 9/1966 | Hungerford, Jr. | 210/232 |
| 3,348,689 | 10/1967 | Kraissl, Jr. | 210/238 |
| 3,358,839 | 12/1967 | Simons | 210/232 |
| 3,490,594 | 1/1970 | Hutchins, Jr. | 210/232 |
| 4,052,307 | 10/1977 | Humbert, Jr. | 210/130 |
| 4,320,005 | 3/1982 | DeGraffenreid | 210/232 |
| 4,371,439 | 2/1983 | Thornton | 210/232 |
| 4,420,396 | 12/1983 | Yamamota et al. | 210/416.4 |
| 4,521,309 | 6/1985 | Pall | 210/493.2 |
| 4,588,503 | 5/1986 | Sugiura | 210/232 |
| 4,764,275 | 8/1988 | Robichaud | 210/232 |
| 4,871,455 | 10/1989 | Terhune et al. | 210/232 |

FOREIGN PATENT DOCUMENTS

| | | |
|---|---|---|
| 229092 | 1/1963 | Austria . |
| 1198790 | 8/1965 | Fed. Rep. of Germany . |
| 982548 | 2/1965 | United Kingdom . |
| 2030052 | 4/1980 | United Kingdom . |

OTHER PUBLICATIONS

Facet Product Sheet, Bulletin 301.1, May 1985.

Primary Examiner—Robert A. Dawson
Assistant Examiner—Wanda L. Millard
Attorney, Agent, or Firm—Fish & Richardson

[57] ABSTRACT

A filter assembly including a base for supporting and providing fluid connection to a removable filter cartridge, the base having a hollow connecting end for mating with the cartridge, a removable filter cartridge comprising a filter medium and having a connecting end shaped to mate coaxially with the end of the base in a rotatable, telescopic relationship, the connecting end of one of the base and the cartridge having lug means extending radially toward the end of the other, the other connecting end having corresponding passage means for lockably receiving the lug means, the telescopically related mating ends of the base and cartridge providing radially opposed surfaces of circular cross-section about the mutual axis of the connecting ends of the base and cartridge, and a circular elastomeric sealing ring providing a radial seal between the circular cross-section surfaces, preventing liquid flow past it between the telescopic ends. Also disclosed are a spring locking mechanism to bias the lug means into locked position, and a filter cartridge having its filter medium both mechanically and adhesively secured to its connecting end member.

30 Claims, 5 Drawing Sheets

FILTER ASSEMBLY WITH LOCKABLE LUG MEANS

This is a continuation in part of U.S. Ser. No. 06/870,237, filed on June 3, 1986, now U.S. Pat. No. 4,871,455.

BACKGROUND OF THE INVENTION

The invention relates to filter assemblies, e.g., those used to filter aviation fuel.

Filters used to remove impurities from aviation fuel and to cause water in the fuel to coalesce into large drops that can settle and be removed by a sump pump are often sealably mounted over inlet openings in the bottom or side walls of fuel tanks or pressurized vessels through which the fuel flows immediately Prior to discharge, such that liquid must pass through the filter before it enters the tank or vessel. These filters are often cylindrical and have an axial opening at the bottom and a tubular filter medium wall through which there is so-called inside-out flow. Similarly shaped filters can be mounted over outlets, in which case there would be outside-in flow.

These cylindrical filters have typically been secured by mating a threaded lower end of a filter cartridge base with a threaded opening in the floor of the tank or vessel or by sliding the filter over a floor-mounted threaded rod and holding it in place with a nut at the top of the filter. If the filters are overtightened, the threads may become worn, and the filters hard to remove. If the filters are undertightened, the filter may not seal well and may even be loosened by vibrations.

SUMMARY OF THE INVENTION

In one aspect, the invention features in general a filter assembly comprising a base for supporting and providing fluid connection to a removable filter cartridge, the base having a hollow connecting end for mating with the cartridge, a removable filter cartridge comprising a filter medium and having a connecting end shaped to mate coaxially with the end of the base in a rotatable, telescopic relationship, the connecting end of one of the base and the cartridge having lug means extending radially toward the end of the other, the other connecting end having corresponding passage means for lockably receiving the lug means, the telescopically related mating ends of the base and cartridge providing radially opposed surfaces of circular cross-section about the mutual axis of the connecting ends of the base and cartridge, and a circular elastomeric sealing ring providing a radial seal between the circular cross-section surfaces, preventing liquid flow past it between the telescopic ends.

In preferred embodiments one connecting end has an annular groove, and the ring is mounted in this groove; the groove is in the cylindrical surface of the filter cartridge; the cartridge is constructed from non-metallic material; the cartridge is completely made of material that can be incinerated; the cartridge includes static dissipative material; the filter medium includes a pleated filter on the inside of the support and layers on the outside of the support; the filter cartridge has a handle at its top permitting rotation and connection or removal of the cartridge; and the handle is rotatable between an upright position and a horizontal position.

In another aspect, the invention features in general a filter assembly comprising a base for supporting and providing fluid connection to a removable filter cartridge, the base having a hollow connecting end for mating with the cartridge, a removable filter cartridge comprising a filter medium and having a connecting end shaped to mate coaxially with the end of the base in a rotatable, telescopic relationship, the connecting end of one of the base and the cartridge being provided with lug means extending radially toward the end of the other, the other of the connecting ends having corresponding passage means for lockably receiving the lug means, the passage means extending along a circumferential path to an angular position and in an axial direction from the circumferential path at the angular position to a locked position in which the lug means is prevented from circumferential movement, and a locking mechanism biasing the lugs in the axial direction into the locked position, whereby the cartridge can be easily secured to the base and removed from the base, and unintended disconnection of the cartridge from the base owing to vibration is avoided.

In preferred embodiments lug means extend from the cartridge, and the passage means are located in the base; the base is provided with struts tranversing the fluid passage; and the locking mechanism is a spring (most preferably a wave spring).

In a third aspect, the invention features in general a filter cartridge assembly comprising a connecting end member having a fluid flow passage therethrough and an annular channel surrounding the passage, a filter medium support including a circular end received in the channel, means for mechanically locking the support to the connecting end member, a filter medium supported by the support and having an end received in the channel, and adhesive in the annular channel securing the end member, the filter medium support and the filter medium and sealably securing the filter medium to the end member.

In some preferred embodiments the means for mechanically locking comprises wedge means applied to the connecting end member, and corresponding slot means on the support to receive the wedge means; the connecting member and the support are constructed from structural plastic; the slots are provided on a flat ring having a flow passage therethrough; the filter assembly further comprises a second filter medium and support mechanically and adhesively connected through a sealing member with annular channels to the first support.

In some other preferred embodiments, a snap-fit connection is employed for mechanical locking, the snap fit connection employing mating locking heads and recesses and reverse angled surfaces to reinforce the locking.

The invention provides a filter cartridge which is quickly and easily connected to a permanently mounted base in a tank or vessel. Vibrations will not cause the filter to lose fluid tight contact with the base. Further, the invention features a filter cartridge which is more readily constructed than prior filters, and can be advantageously disposed of by incineration after usage, as there are no metal parts.

Other features and advantages of the invention will be understood from the following description of a presently preferred embodiment, and from the claims.

DESCRIPTION OF THE PREFERRED EMBODIMENTS

The figures will be briefly described first.
Drawings

Structure

Figure 1:
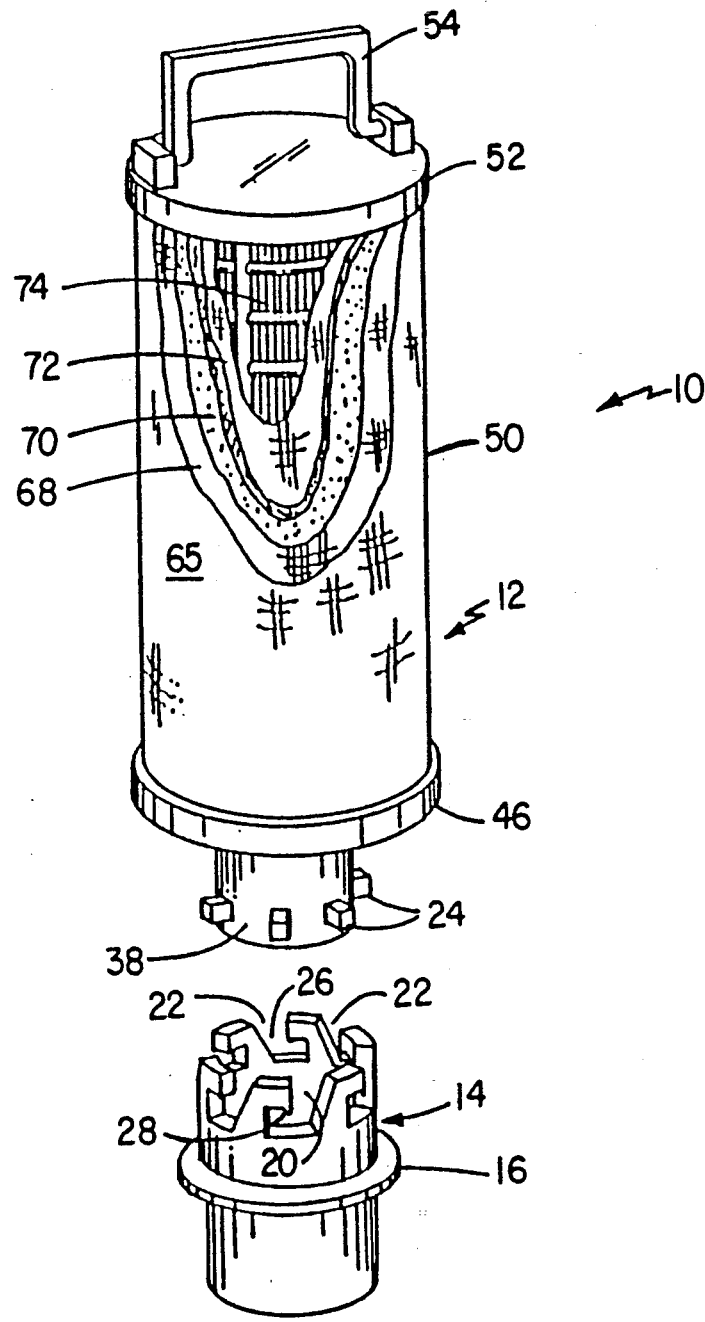
FIG. 1 is a diagrammatic perspective view, partially broken away, of a filter base and a mating removable filter cartridge according to the invention.
Figure 2:
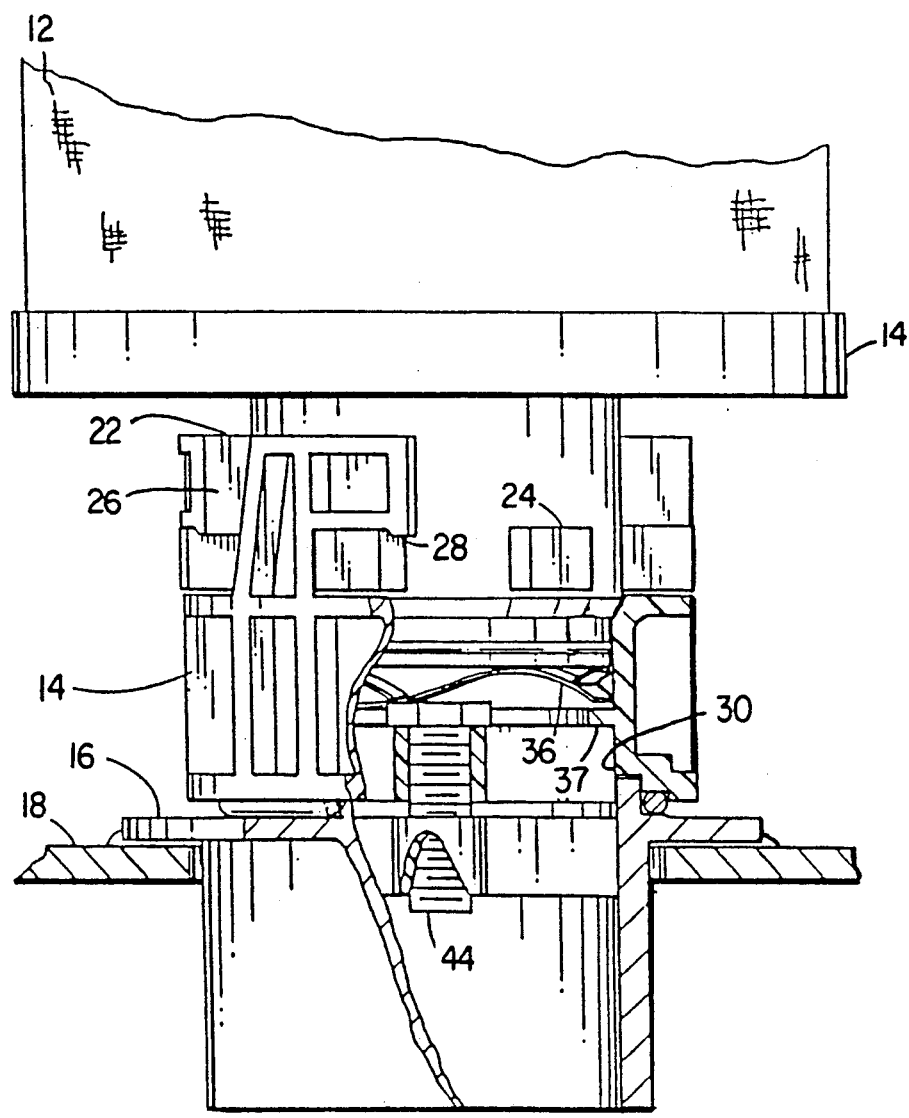
FIG. 2 is a partial elevation, partly broken away, showing the FIG. 1 base and cartridge lockably connected together.
Figure 2A:
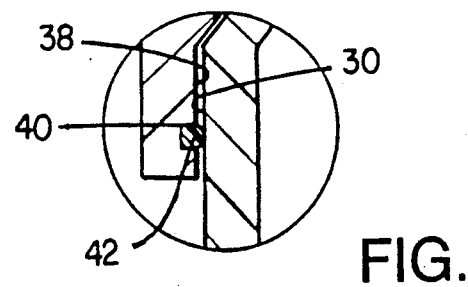
FIG. 2a is a partial elevation of the FIG. 2 base.

Referring to FIGS. 1 and 2, filter assembly 10 includes removable filter cartridge 12 and plastic adapter base 14 mounted on metal stool 16, welded to fuel tank wall 18, so that fluid entering or leaving the tank must pass through stool 16 and base 14.

Base 14 has a series of locking passages 22 for mating with lugs 24 on filter cartridge 12. Each passage 22 extends along an entrance 26 to a horizontal circumferential path ending at an angular position, and then extends axially upward slightly to a locked position circumferentially adjacent to locking tab 28, which prevents rotational movement of lug 24 within passage 22 when lug 24 is urged upward into the locked position.

Figure 3:
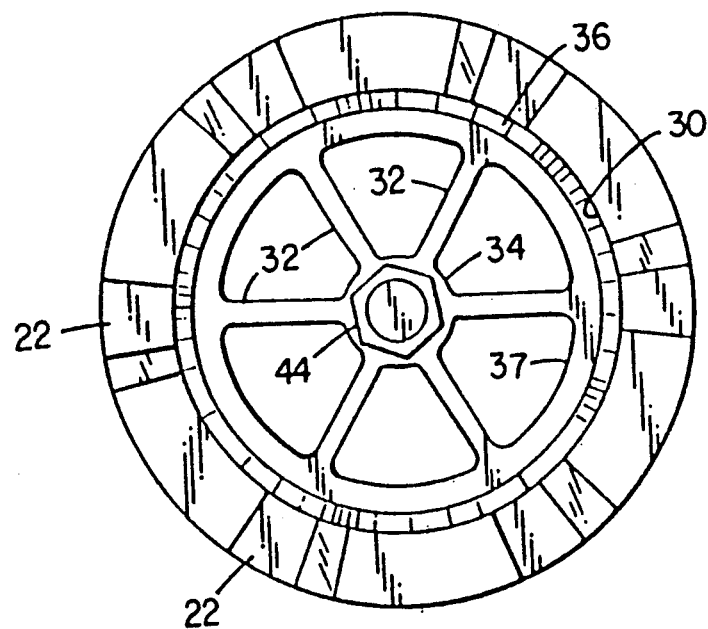
FIG. 3 is a plan view of the FIG. 1 base.

Base 14 has a cylindrical surface 30 defining a fluid passage and is provided with struts 32, shown in FIG. 3, which extend radially from hub 34 to surface 30. Lip 37, directly on top of struts 32, supports wave spring 36 against which filter cartridge 12 is applied. Wave spring 36 is made of 0.030" thick, ⅛" wide, 316 stainless steel, making about 3 complete coils and bent to provide 3½ peaks per 360°. The free height of spring 36 is ¾", and it takes between 25 and 35 lb. force to push spring 36 down to its ¼" compressed height.

Referring to the enlarged portion of FIG. 2. Cartridge 12 includes lower cylindrical surface 38, telescopically received in and facing surface 30 of base 14. Surface 38 includes annular recess 40 in which elastomeric sealing O-ring 42 is retained. O-ring 42 serves to tightly seal cartridge 12 and base 14 together, regardless of application of any axial force, as with gaskets. Surface 30 is 3.000"+0.002"−0.000" in diameter; surface 38 is 2.997"+0.000"−0.001" in diameter; groove 40 is 2.778"+0.000"−0.002" in diameter and 0.190"+0.002"−0.003" wide, and O-ring 42 (industry designation 2-232) has a 2.734" inner diameter and a 0.139"+0.004"−0.004" cross section. Base 14 is connected to the stool 16 of base 12 by bolt 44.

Figure 4:
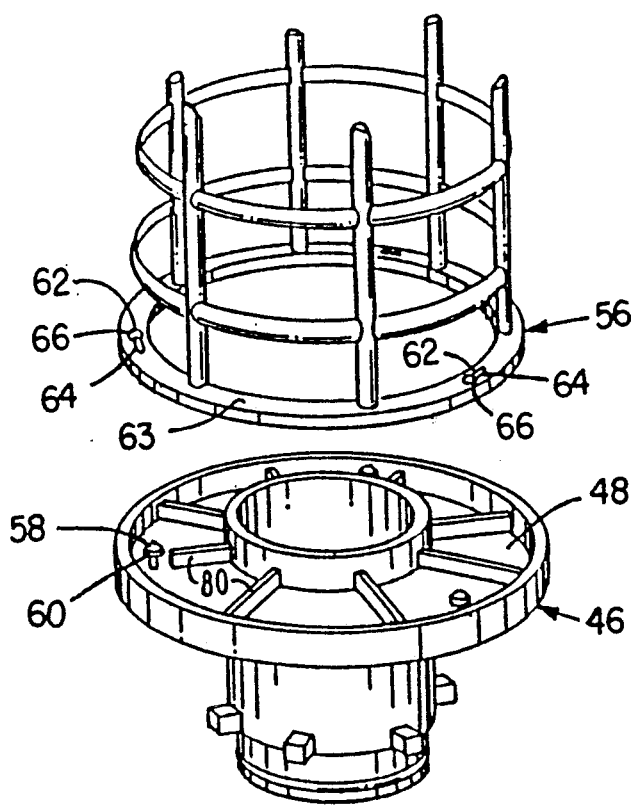
FIG. 4 is an exploded perspective view of a connecting end member and filter medium support of the FIG. 1 cartridge.

Referring to FIGS. 1 and 4, filter cartridge 12 includes connecting end member 46 with annular channel 48 into which the lower end of tubular filter medium 50 is sealably connected. The other end of filter medium 50 is similarly connected in a channel (not shown) in cap 52, provided with a pivotally mounted handle 54. Medium 50 includes a series of layers supported by plastic framed support 56. These include outer cotton fabric sock 65, 2" helical overlapping wrap of plastic screen 68, ¼" thick layer 70 of fiberglass thereunder, sheet of plastic screen 72 thereunder wrapped around ribs and columns of framed support 56, and pleated filter medium 74 on the inside of support 56. Pleated filter medium 74 is approximately ⅞" in overall radial dimension, the inner portion at the bottom fitting within annular channel 48.

Referring to FIG. 4, connecting end member 46 is provided with three axial pins 58 with oversized heads 60. Oversized heads 60 are designed to fit into slots 62 of lower flat ring 63. Slots 62 consist of circular openings 66, larger in diameter than the heads 60 of pins 58, and elongated portions 64, narrower than heads 60 of pins 58. In the finished cartridge 14, pins 58 are in narrow elongated portions 64, mechanically locking support 56 to end member 46 by wedging ring 63 against radial ribs 80.

Base 14, connecting end member 46 and frame 56 are made of structural plastic (available under the trade designation Valox from G.E., 15% glass filled).

Filter cartridge 12 is manufactured by inserting the lower end of filter components 65, 68, 70, 72, 74 and support 56 into annular groove 48 (already containing exothermic adhesive), mechanically locking support 56 to end member 46 using pins 58 and slots 64, and letting the adhesive set. The position of heads 60, the thickness of ring 63 and the height of radial ribs 80 are such that rotation of support 50 is against frictional forces acting to wedge support 56 in place. In a similar manner the other end of the filter cartridge is connected to top cap 52, shown in FIG. 1. Thus, both mechanical locking and chemical support are used to connect members together, more securely than prior use of adhesive alone.

Use

Filter cartridge 12 can be readily inserted into a fixed adapter base 14 by positioning the cartridge over the base as shown in FIG. 1. Lugs 24 of the cartridge are inserted into passages 22 of the base and pushed down using handle 54. The cartridge is then pushed against wavespring 36, rotated to the end of the circumferential portion of the passage, and released, wavespring 36 urging lugs 24 into locked positioned next to tabs 28. In this way filter cartridge 14 is securely fixed to base 12 and cannot be loosened by mere vibrational forces. The forces resulting from pressure difference inside and outside of cartridge 12 act upward, the same direction as the spring, reinforcing the locking. In the locked position fluid passing through base 12 must pass through filter cartridge 12 and thus through medium 50, as sealing O-ring 42 prevents liquid flow around the bottom of connecting end 46. The seal provided by O-ring 42 advantageously is not dependent on axial forces, as flat gaskets are. Filter medium 50 prevents solid particles from entering the tank and also cause coalescence of water within the fuel entering the tank, so that, upon leaving the filter, the water is in the form of large droplets that settle to the bottom of the tank, where they are removed by a sump pump or other means.

Removal of the cartridge is accomplished by pushing down on cartridge 12, using handle 54, and rotating the assembly such that lugs 24 are moved to entrances 26. The cartridge can then be pulled from the base, and then quickly be replaced by a second cartridge inserted into base 14, the entire changeover taking a matter of seconds, which is particularly significant when replacing a large number of filter cartridges at one time. Since the entire cartridge is constructed of combustible material, the removed cartridge can be incinerated and readily disposed of.

Other Embodiments

Other embodiments are within the scope of the following claims.

Figure 5:
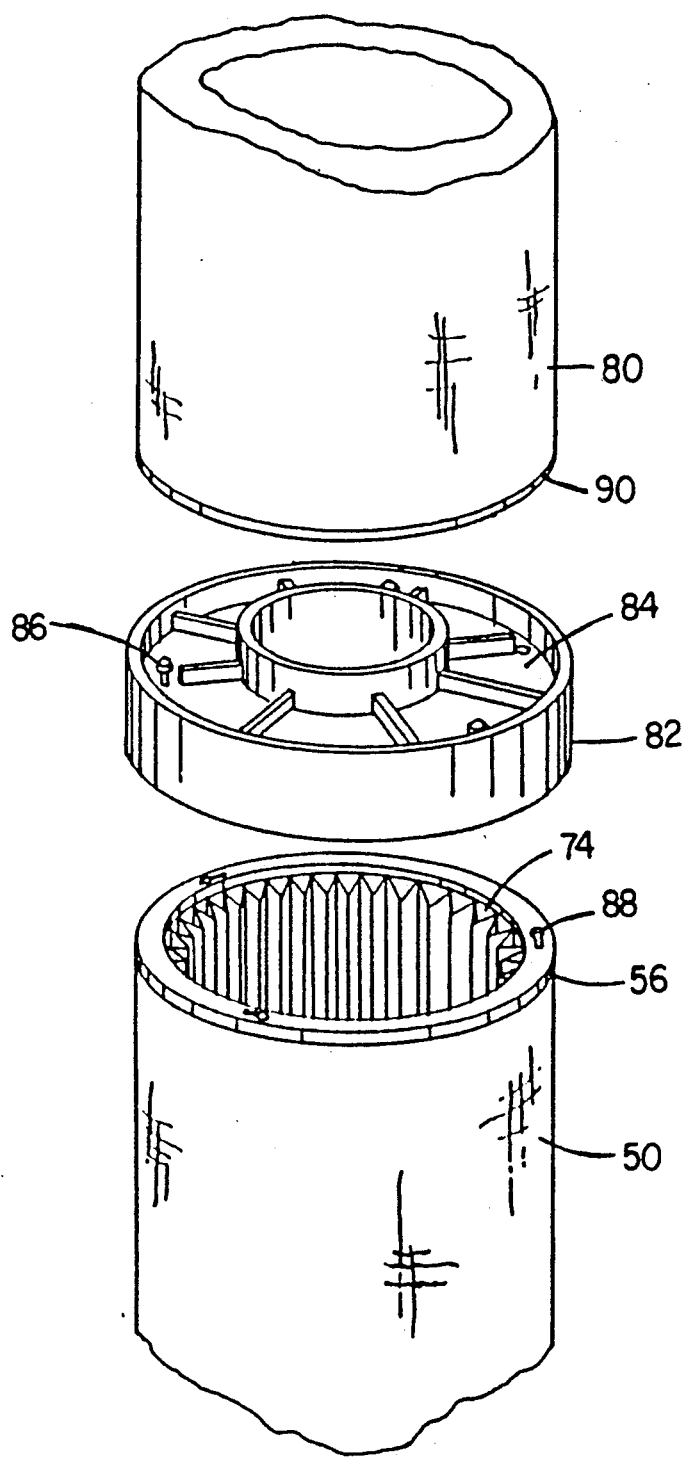
FIG. 5 is an exploded perspective view of a portion of an alternative embodiment of the FIG. 1 cartridge.
Figure 6:
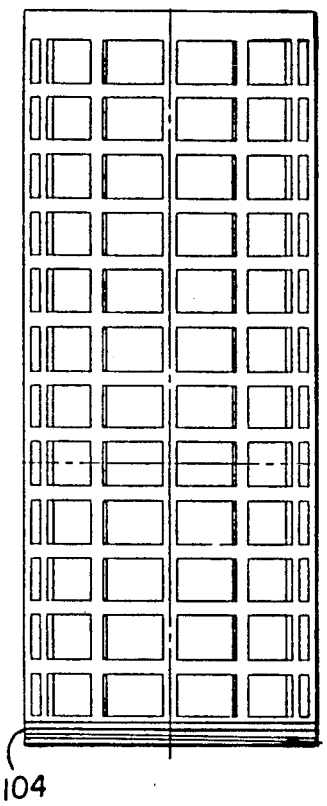
FIG. 6 is an elevation of a filter support of another embodiment of the FIG. 1 cartridge.

For example, in FIG. 5, further filter medium 80 is shown prior to connection sealing member 82, including two annular channels 84 with locking pins 86 for connection to slots 88 on framed support 56 of lower medium 50 and framed support 90 of further medium 80. A cap 52 and handle 54 (not shown) are attached to the top of support 90 and medium 80. The overall cartridge thus has twice the filtering and coalescing capacity of single stage filter cartridge 12.

In FIGS. 6-9 are shown a filter support 100 and connecting end member 102 of another embodiment of the FIG. 1 cartridge, which embodiment is presently most preferred. Both pieces are made of injection molded polyester. In this embodiment, mechanical locking is provided by a snap fit connection provided by locking ring 104 on filter support 100 and twelve mating locking tabs 106 on connecting end member 102. Locking tabs 106 are equally spaced at the same radial distance from axis 108 and each take up 30° along a circle through them.

Figure 9:
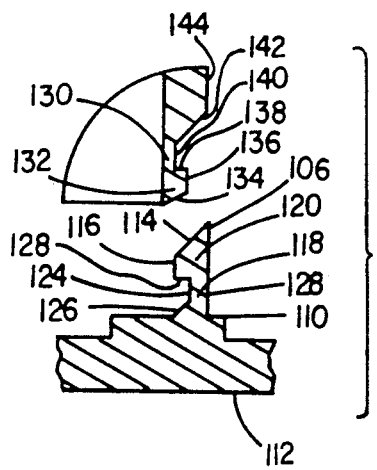
FIG. 9 is a vertical sectional view of mating portions of the FIG. 6 filter support and the FIG. 7 connecting end member.
Figure 7:
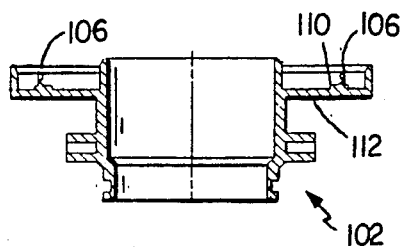
FIG. 7 is a vertical sectional view of a connecting end member that mates with the FIG. 6 filter support.
Figure 8:
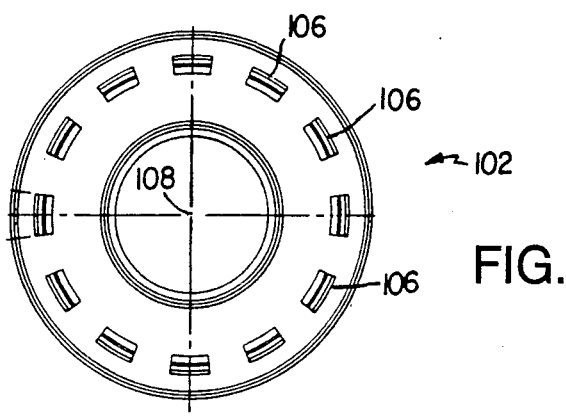
FIG. 8 is a plan view of the FIG. 7 connecting end member.

Referring to FIG. 9, each locking tab 106 has a narrow connecting portion 118 and a locking head 120 supported on a 0.625" wide (radial dimension) and 0.052" to 0.062" high mounting pad 110 on floor 112. The tip of locking head 120 is 0.312" above floor 112 and 0.250" to 0.260" above mounting pad 110. Locking head 12 has cam surface 114 (which makes a 45° angle with the vertical), inner vertical surface 116 at a diameter of 5.082" to 5.984", and lower surface 122 at an angle of 15° with the horizontal. Vertical surface 124 of connecting portion 118 is at a diameter of 5.166" to 5.168", and inclined surface 126 is at an angle of 30° with the horizontal and ends at mounting pad 110 at a diameter of 5.000" to 5.010". Outer surface 128 of connecting portion 118 and head 120 is at a diameter of 5.245" to 5.250".

Locking ring 104 has connecting portion 130 and locking head 132, both of which have inner diameter surfaces at a diameter of 5.000". Locking head 132 has cam surface 134 (which makes a 30° angle with the horizontal), outer vertical surface 136 at a diameter of 5.082" to 5.084", and upper surface 138 at an angle of 15° with the horizontal. Vertical surface 140 of connecting portion 130 is at a diameter of 5.166" to 5.168", and inclined surface 142 is at an angle of 45° with the vertical. The junction of vertical surface 136 and inclined surface 138 is at a distance along a vertical axis from the tip of locking head 132 of 0.095" to 0.097". Outer surface 144 of filter support 100 has a diameter of 5.250".

Manufacture of the FIG. 1 filter cartridge from filter support 100 and connecting end member 102 is as described above, except that locking ring 104 is snapped into locking tabs 106. Inclined surface 114 slides along inclined surface 134, and connecting portions 118, 130 bend slightly as locking head 120 snaps into the recess adjacent to connecting portion 130 and locking head 132 snaps into the recess adjacent to connecting portion 118. Locking tabs 106 are integral with the rest of connecting end member 102, and thus do not require an additional step in the manufacture procedure. Very secure mechanical locking is provided by interference of abutting surfaces 122 and 138, and this mechanical locking is reinforced by the reverse angles of surfaces 122, 138 (causing them to lock even tighter in response to forces tending to pull filter support 100 and connecting end member 102 apart) and the matching dimensions and orientations of mating surfaces 114 and 142, 116 and 140, 122 and 138, 124 and 136, and 126 and 134. In use of the resulting filter cartridge, the combination of mechanical locking and chemical support of the adhesive hold the filter support 100 and connecting end member 102 together, resisting shock pressure forces to which the filter cartridge is subjected.

What is claimed is:

1. A filter cartridge assembly comprising
   a connecting end member having a fluid flow passage therethrough and an annular channel surrounding said passage,
      said connecting end member having portions for making connection of said filter cartridge assembly to a filter mounting structure,
   a filter medium support including a circular cross-section end received in said channel,
      said filter medium support being generally cylindrical in configuration,
   said connecting end member and said support defining a means for mechanically locking said support to said connecting end member,
   a filter medium supported by said support and having a circular cross-section end received in said channel, and
   adhesive in said annular channel permanently securing said end member, said filter medium support and said filter medium to each other and sealably securing said filter medium to said end member.

2. The filter cartridge assembly of claim 1 wherein said connecting end member has an outwardly-directed circular cross-section surface and lug means that extend radially from said surface for lockably engaging passage means in a mating base member.

3. The filter cartridge assembly of claim 2 further comprising a circular elastomeric sealing ring mounted around said circular cross-section surface.

4. The filter cartridge assembly of claim 3 further comprising a base for mating with said connecting end member, said base having an inwardly directed circular cross-section surface and a passage means for lockably receiving said lug means.

5. The filter cartridge assembly of claim 4 wherein said passage means extends in a first circumferential direction along a first circumferential path at a first axial position to an angular position and in an axial direction from said first circumferential path at said angular position to a locked position at a second axial position that is different from said first axial position, there being a stop member at a position along a second circumferential path at said second axial position such that said lug means is prevented from circumferential movement along said second circumferential path in a second circumferential direction opposite to said first circumferential direction, and further comprising a locking mechanism biasing said lug means relative to said passage means in said axial direction into said locked position, said biasing being in the direction to cause said connecting end member to be biased away from said base.

6. The filter cartridge assembly of claim 5 wherein said locking mechanism is a spring.

7. The filter assembly of claim 6 wherein said spring is a wave spring that completely surrounds a flow passage through said base and has portions at different axial positions.

8. The filter cartridge assembly of claim 5 wherein said base includes struts transversing a fluid passage of said base, said struts joining at a central hub having a hole therethrough for receiving a member for connecting said base to a vessel wall.

9. The filter cartridge assembly of claim 5 wherein said connecting end member has an annular groove in said outwardly directed surface, and said ring is mounted in said groove.

10. The filter cartridge assembly of claim 5 further comprising a handle connected to said filter medium support permitting rotation and connection or removal of said cartridge.

11. The filter cartridge assembly of claim 5 further comprising a handled connected to said filter medium support permitting rotation and connection or removal of said cartridge, and said handle is rotatable between an upright position and a horizontal position.

12. The assembly of claim 1 wherein said locking means comprises a locking head on one of said connecting end member and said filter medium support, said locking head snapping into a recess on the other of said connecting end member and said filter medium support as the connecting end member and the filter medium support are brought together.

13. The assembly of claim 12 wherein said connecting end member and said filter medium support each have a locking head and a recess that mate with a recess and a locking head, respectively, on the other.

14. The assembly of claim 13 wherein there are narrow connecting portions adjacent to said recesses.

15. The assembly of claim 14 wherein there are first inclined surfaces on said locking heads to cause said heads to slide on each other as they are snapped in place.

16. The assembly of claim 15 wherein each said locking head has a second inclined surface that faces the second inclined surface of the mating locking head, said second inclined surface being inclined in the same direction as said first inclined surface so as to cause said locking heads to lock even tighter in response to forces tending to pull said filter medium support and said connecting end member apart.

17. The assembly of claim 13 wherein one said locking head is a continuous ring.

18. The filter assembly of claim 1 wherein said locking means comprises wedge means for wedging said support against said connecting member.

19. The filter assembly of claim 18 wherein said wedge means comprise projections extending axially from said connecting end member at said annular channel, said projections including necks and headed ends of larger width, and slot means provided by said support to receive said projections, said slots including portions wider than said headed ends and portions narrower than said headed ends.

20. The filter assembly of claim 19 wherein said support includes a circular ring plate having a flow passage therethrough and providing said slot means.

21. The filter assembly of claim 20 wherein said connecting member and said support are constructed from structural plastic.

22. The filter assembly of claim 20 wherein said filter medium comprises a pleated filter inside of said support and individual layers outside of said support, the ends of said pleated filter and layers being located in said annular channel.

23. The filter assembly of claim 20 wherein said connecting member has a diameter between 5 and 6 inches.

24. The filter assembly of claim 20 wherein said wedge means further comprises radial ribs in said channel, said circular ring plate being supported on top of said ribs.

25. The assembly of claim 19 wherein said cartridge is made of nonmetals, can be incinerated, and includes structural plastic and static dissipative material.

26. The filter assembly of claim 1 further comprising a sealing member having an annular channel receiving the other end of said filter medium and adhesive in said channel.

27. The filter assembly of claim 26 wherein said sealing member has a flow passage therethrough and a second annular channel on the opposite side, and further comprising a second filter medium with an end in said second annular channel and adhesive in said annular channel.

28. The filter assembly of claim 27 wherein said connecting member has diameter of between 5 to 6 inches, and said filter medium includes material causing coalescing of water in fuel passing through said medium.

29. The assembly of claim 1 wherein said cartridge is completely made of material that can be incinerated, and includes structural plastic.

30. A method of making a filter cartridge assembly comprising providing a connecting end member, a filter medium support, means for mechanically locking said support to said end member, and a filter medium, said connecting end member having a fluid flow passage therethrough and an annular channel surrounding said passage, said connecting end member having portions for making connection of said filter cartridge assembly to a filter mounting structure, said filter medium support including a circular cross-section end sized to be received in said channel, said filter medium support being generally cylindrical in configuration, said filter medium being supported by said support and having a circular cross-section end sized to be received in said channel, said connecting end member and said support defining said means for mechanically locking, applying adhesive in said annular channel, mechanically connecting said filter medium support to said connecting end member by connecting said means for mechanically locking, and allowing said adhesive to set so as to permanently secure said end member, said filter medium support and said filter medium to each other and sealably secure said filter medium to said end member.

* * * * *